United States Patent
Shen et al.

[15] 3,678,094

[45] July 18, 1972

[54] SUBSTITUTED ANILINO CARBOXYLIC ACIDS

[72] Inventors: Tsung-Ying Shen; Bruce E. Witzel; Gordon L. Walford, all of Westfield, N.J.

[73] Assignee: Merck & Co., Inc., Rahway, N.J.

[22] Filed: April 20, 1970

[21] Appl. No.: 30,321

Related U.S. Application Data

[63] Continuation-in-part of Ser. No. 836,631, June 25, 1969.

[52] U.S. Cl.............260/471 R, 260/247.1, 260/247.2 A, 260/293.73, 260/293.78, 260/326.3, 260/463, 260/465 D, 260/470, 260/472, 260/479 K, 260/516, 260/519, 260/559 T, 424/248, 424/267, 424/274, 424/304, 424/310, 424/319

[51] Int. Cl..................................................C07c 101/54

[58] Field of Search..................................260/519, 471 R

[56] References Cited

OTHER PUBLICATIONS

Finar, I. L. Organic Chemistry, Vol. I (1963), pub. by Richard Clay & Co., London (QD251F56) pages 187, 203 & 633 cited.

*Primary Examiner*—Lorraine A. Weinberger
*Assistant Examiner*—L. Arnold Thaxton
*Attorney*—Michael C. Sudol, Jr., Harry E. Westlake, Jr. and I. Louis Wolk

[57] ABSTRACT

New substituted anilino carboxylic acids and non-toxic pharmaceutically acceptable salts, esters, amides, and various derivatives thereof are claimed. The substituted anilino-carboxylic acids described herein have anti-inflammatory, antipyretic, and analgesic activity. Also included is a method of preparing said anilino carboxylic acids and method of treatment using certain of these substituted anilino carboxylic acids.

4 Claims, No Drawings

SUBSTITUTED ANILINO CARBOXYLIC ACIDS

CROSS REFERENCE TO RELATED APPLICATIONS

This application is a continuation-in-part of our co-pending U.S. application Ser. No. 836,631 filed June 25, 1969.

BACKGROUND OF THE INVENTION

The development of anti-inflammatory compounds in the past two decades has seen the growth of a great many new drugs. Most of these have been steroids of the 11-oxygenated pregnane series. These, while highly effective, have the drawback of causing many side effects. There is a need in the market for equally effective compounds of much simpler structure and having less side effects.

SUMMARY OF THE INVENTION

Generally this invention relates to new substituted anilino carboxylic acids and process for preparing same. The invention also relates to the use of various carboxylic acids as a method of treating inflammation. Compounds covered by this invention are useful in that they have anti-inflammatory activity and are effective in the prevention and inhibition of edema and granuloma tissue formation. In addition, some of them have a useful degree of anti-pyretic, analgesic, diuretic, anti-fibrinolytic and hypo-glycemic activity.

DESCRIPTION AND PREFERRED EMBODIMENTS

This invention relates to new substituted anilino carboxylic acids and processes for preparing the same. More specifically, this invention relates to substituted anilino carboxylic acids, esters, amides and non-toxic pharmaceutically acceptable salts thereof. Still more specifically, this invention relates to compounds having the following formula:

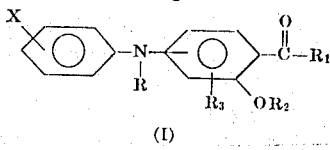

(I)

wherein R is hydrogen or lower alkyl such as methyl,
ethyl, propyl, isopropyl, etc., R being hydrogen only when X is fluoro, diloweralkylamino, loweralkylamino, loweralkylthio, loweralkylsulfinyl or loweralkylsulfonyl, $R_1$ is hydroxy, amino,
lower alkoxy (such as methoxy, ethoxy, butoxy, pentoxy, etc.),
loweralkylamino (such as methylamino, propylamino, pentylamino etc.),
di(loweralkyl)amino (such as dimethylamino, dibutylamino, propylpentylamino, etc.),
diloweralkylaminoloweralkylamino, diloweralkylaminoloweralkoxy,
hydroxyloweralkoxy (such as 3-hydroxypropoxy, 2-hydroxypropoxy 4-hydroxybutoxy, etc.),
polyhydroxyloweralkoxy (such as 2,3-dihydroxypropxy, 2,3,4,5,6-pentahydroxyhexyloxy etc.),
loweralkoxyloweralkoxy (such as ethoxyethoxy),
phenylloweralkoxy (benzyloxy or phenethoxy),
phenoxy,
substituted phenoxy (such as loweralkoxy phenoxy, diloweralkylaminophenoxy, halo phenoxy, loweralkanoylaminophenoxy, etc.,
phenylamino,
loweralkanoylamino-loweralkoxy,
hydrazino hydroxylamino,
N-morpholino,
hydroxyloweralkylamino and a naturally occurring amino acid radical with attachment at the N such as glycine, phenylalanine, proline, methionine, taurine, etc.),
$R_2$ is hydrogen,
acyl (preferably lower acyl such as formyl, acetyl, propionyl, butyryl, etc.),
alkyl (preferably loweralkyl such as methyl, ethyl, propyl, isopropyl, butyl, pentyl, etc.),
alkoxy carbonyl (preferably loweralkoxy carbonyl such as methoxycarbonyl, ethoxycarbony, hexoxycarbonyl, etc.),
the $OR_2$ radical being ortho to the carboxy-radical
$R_3$ is hydrogen,
halogen (such as chloro, bromo, fluoro, or iodo, preferably fluoro or chloro),
haloalkyl (preferably haloloweralkyl such as trifluoromethyl, etc.),
alkyl (preferably loweralkyl, such as methyl, ethyl, propyl), isopropyl, butyl, pentyl, etc.),
cycloalkyl (such as cyclopropyl, cyclobutyl, cyclopentyl, cyclohexyl cycloheptyl etc.),
alkoxy (preferably loweralkoxy such as methoxy, ethoxy, isopropoxy, butoxy, etc.), and
X is hydrogen,
alkyl, (preferably loweralkyl, such as methyl, ethyl, propyl, isopropyl, butyl, pentyl etc.),
hydroxy,
alkoxy (preferably loweralkoxy, such as methoxy, ethoxy, isopropoxy, butoxy, etc.),
acyloxy (such as benzoyloxy, acetoxy, propionoxy etc.),
halogen (such as chloro, bromo, fluoro or iodo, preferably fluoro or chloro),
haloalkyl (preferably haloloweralkyl such as trifluoromethyl, etc.),
nitro,
amino,
alkylamino (preferably lower alkylamino such as methylamino, propylamino, pentylamino etc.),
diloweralkylamino (preferably dimethylamino, diethylamino, dibutylamino, propylpentylamino etc.),
acylamino (preferably loweracylamino such as formylamino, acetylamino, propionylamino, butyrylamino etc.),
mercapto,
alkylmercapto (preferably loweralkylmercapto such as methylmercapto, ethylmercapto, etc.),
alkylsulfinyl (preferably lower alkylsulfinyl such as methylsulfinyl, ethylsulfinyl, butylsulfinyl, etc.)
alkylsulfonyl (preferably loweralkyl sulfonyl such as methylsulfonyl, ethylsulfonyl, butylsulfonyl etc.),
sulfonamido,
sulfamyl,
alkylaminoalkyl (preferably loweralkylamino loweralkyl such as methylaminomethyl, ethylaminomethyl),
dialkylaminoalkyl, preferably diloweralkylamino loweralkyl,
hydroxyalkyl (preferably hydroxyloweralkyl such as hydroxymethyl, hydroxyethyl, hydroxypropyl, etc.),
alkoxyalkyl (preferably loweralkoxyloweralkyl such as methoxymethyl, methoxyethyl, ethoxy-ethyl, ethoxypropyl, etc.),
mercaptoalkyl (preferably mercaptoloweralkyl such as mercaptomethyl, mercaptoethyl. etc.),
alkylmercaptoalkyl (preferably loweralkylmercaptoloweralkyl such as methylmercaptomethyl, ethylmercaptoethyl, ethylmercaptopropyl, etc.),
cyano,
carboxy,
carboalkoxy (such as carbomethoxy, carboethoxy, carbamoyl)
aryl (such as phenyl, tolyl, halophenyl, etc.),
aralkyl (such as benzyl, phenethyl, etc.),
aryloxy,
aralkoxy.

Preferred compounds included in the above invention are those of Formula I wherein the anilino portion of the substituted anilino carboxylic acid is connected to the 4 or 5 position of the salicylic acid moiety, and the non-toxic pharmaceutically acceptable salts thereof.

R is hydrogen or loweralkyl, R being hydrogen only when X is fluoro, diloweralkylamino, loweralkylthio, loweralkylsulfinyl, lower alkyl sulfonyl, $R_1$ is hydroxy, lower alkoxy, diethylaminoethoxy and simple amines such as amino, lower-alkylamino, diloweralkylamino, morpholino, and dialkylaminoalkylamino, $R_2$ is hydrogen, acetyl, loweralkyl, loweralkoxycarbonyl, $R_3$ is hydrogen, halogen, loweralkyl, trifluoromethyl, loweralkoxy, X is halo, lower alkoxy, diloweralkylamino, loweralkyl, loweralkylthio and the oxidation products of loweralkylthio, such as loweralkylsulfinyl and loweralkylsulfonyl.

Representative compounds falling within this invention are:
5-(p-fluoroanilino)-salicylic acid 5-(N-methyl-p-fluoroanilino)-salicylic acid methyl 5-(p-fluoroanilino N-methyl)-salicylate 5-(p-fluoroanilino)-2-acetoxy-benzoic acid 5-(N-methyl-p-fluoroanilino)-2-acetoxy benzoic acid This invention also relates to a method of treating inflammation in patients using a compound of Formula I, with no restriction as to X being only certain groups when R is hydrogen, particularly, however, the invention relates to a method of treating inflammation using an especially preferred compound as the active constituent.

In those compounds of Formula I wherein R is hydrogen, it should be noted that the invention only relates to a method of treating inflammation. Compounds wherein R is hydrogen and X is fluoro, and other specified groups are also novel. With regard to the compound where R is loweralkyl, the invention relates to compounds per se and also to a method of treating inflammation.

We have found that the compounds of Formula I have anti-inflammatory activity and are effective in the prevention and inhibition of edema and granuloma tissue formation as shown by reduction of edema in the rat's foot induced by the injection of an inflammatory (phlogistic) agent into the rat's foot.

The compounds of the instant invention can be used to treat inflammation by reducing inflammation and relieving pain in such diseases as rheumatoid arthritis, osteoarthritis, gout, infectious arthritis and rheumatic fever.

The compounds of Formula I also have anti-pyretic analgesic, diuretic, anti-fibrinolytic and hypo-glycemic activity and would be administered and used in the same manner and in the same dosage ranges as if they were being used to treat inflammation as discussed further on.

The treatment of inflammation in accordance with the method of the present invention is accomplished by orally administering to patients a composition of a compound of Formula I, particularly the especially preferred compounds in a non-toxic pharmaceutically acceptable carrier, preferably in tablet or capsule form.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, cab-o-sil, and acacia. Exemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup or a liquid suspension.

The active compounds of Formula I and of the compositions of this invention are present in an amount sufficient to treat inflammation, that is to reduce inflammation. Advantageously, the composition will contain the active ingredient, namely, the compounds of Formula I in an amount of from about 1 mg. to 100 mg. per kg. body weight per day (50 mg. to 7 g. per patient per day), preferably from about 2 mg. to 50 mg./kg. body weight per day (100 mg. to 3 g. per patient per day).

The method of treatment of this invention comprises internally administering to a patient (animal or human), a compound of Formula I, particularly an especially preferred compound admixed with a non-toxic pharmaceutical carrier such as exemplified above. The compounds of Formula I and particularly the especially preferred compounds will be present in an amount of from 1 mg. to 100 mg./kg. body weight per day, preferably from about 2 mg. to about 50 mg. per kilogram body weight per day and especially from 4 mg. to 20 mg./kg. body weight per day. The most rapid and effective anti-inflammatory effect is obtained from oral administration of a daily dosage of from about 4 to 20 mg./kg./day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of administration, route of administration, rate of excretion, drug combination, reaction sensitivities and severity of the particular disease.

All the salicylic acid compounds of this invention may be prepared by carboxylating the appropriate substituted anilinophenol. This can be accomplished by heating the appropriate substituted anilinophenol salt under pressure with carbon dioxide gas. The product can then be isolated from the reaction mixture by methods known in the art. The temperature at which the reaction can take place is from 50° to 300° C. The reaction can also take place at from atmospheric pressure to high pressure, preferably, however, at 200° C. and at about 1,600 p.s.i. pressure.

The compounds of this invention wherein $R_1$ is a group such that an ester is the final compound (i.e., $R_1$ is alkoxy) are prepared by any esterification procedure using an esterifying agent containing the appropriate $R_1$ group. For example, the salicylic acid compounds of this invention may be reacted with the appropriate lower alkanol, preferably methanol, in the presence of a strong acid such as hydrochloric or sulfuric acid and the like to form the desired compound. The reaction may occur at room temperature over an extended period of time or at elevated temperatures.

The compounds of this invention wherein $R_1$ is a group such that an amide is the final compound (i.e., where $R_1$ is amino or substituted amino) may be prepared by any suitable amidation reaction. For example, the carboxylic acid compound (preferably the methyl or ethyl ester) may be reacted with ammonia, ammonium hydroxide or an amine compound at any suitable temperature (room temperature to reflux). When the amino group is desired, it is preferred to carry out the reaction with ammonia in a bomb at ca. 100° C. to form the desired $R_1$ (amino) compound.

The salts of the final acid compounds of this invention may be prepared by any of the well-known metathesis procedures. For example, the carboxylic acid compound may be reacted with an inorganic base such as sodium hydroxide, potassium hydroxide, etc. or with an amine such as diethylaminoethanol and the like.

Various derivatives of the substituted anilino carboxylic acid compounds particularly those having substituents in the phenyl ring and in the salicylic acid ring are prepared from other type derivatives having substituents different from those being prepared by conventional procedures shown in the prior art. A few examples are shown describing these procedures.

Generally, the end compounds of this invention are prepared according to the following flow sheet:

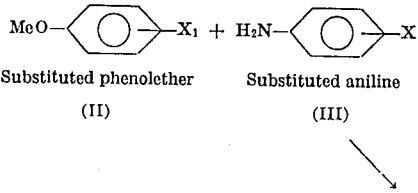

Substituted phenolether    Substituted aniline
(II)                       (III)

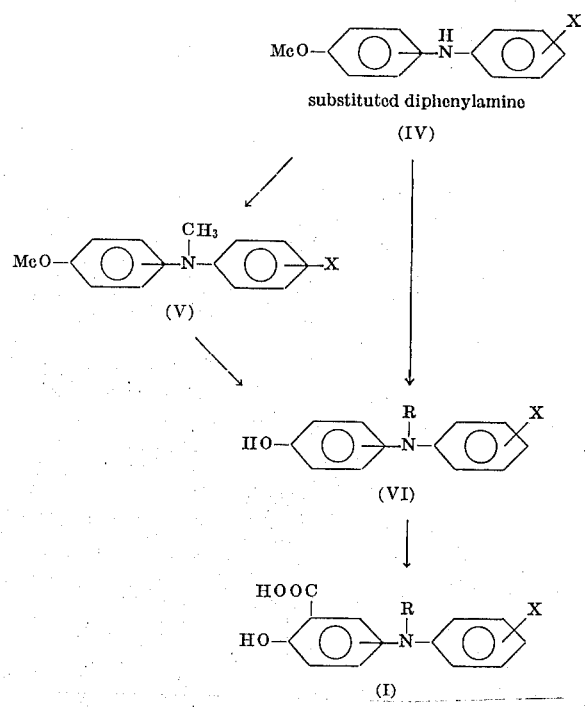

wherein $X_1$ is bromo or chloro; and X and R are as previously defined.

Generally, to prepare the compounds of Formula I, a substituted phenol ether is reacted with a substituted aniline to prepare a substituted diphenylamine of Formula IV.

Then, if compounds of Formula I are desired where R is lower alkyl, the substituted diphenylamine is reacted with a diloweralkyl sulfate or alkylhalide to form an N-lower alkyl derivative of Formula V.

The immediate precursors of the desired end products namely Compound (VI) are then prepared by converting compound (V) or (IV) to the desired hydroxy derivative compound (VI) by cleaving compounds (V) or (IV).

The desired end products are then prepared by carboxylating compound (VI) as previously described.

Various derivatives of Compound (I) can be prepared by procedures well known in the art. Many of these conversions are shown in the examples. Similarly, by starting with the appropriately substituted starting materials of Formula II or III one can end with the desired substituted Compound (I).

Following are a list of examples which describe this invention in greater detail. The examples should be construed as illustrations of the invention and not limitations.

EXAMPLE 1

A. N-Methyl-N-phenyl-p-anisidine

A mixture of N-phenyl-p-anisidine (0.1 m.) and dimethylsulfate (0.12 m.) is heated on the steam bath under anhydrous conditions for 8 hours. The mixture is allowed to cool, excess dilute sodium hydroxide solution carefully added, and the mixture extracted well with chloroform and benzene. The combined organic layers are dried, filtered, and concentrated, and the residue chromotographed on a silica gel column using an ether-ptroleum ether system (0–90 percent ether) as eluant to give N-methyl-N-phenyl-p-anisidine.

When diethyl sulfate is used in place of dimethyl sulfate in the above reaction, the corresponding N-ethyl analog is obtained.

B. N-(p-Nitrophenyl)-p-anisidine

A mixture of p-nitroaniline (0.3 m.), powdered anhydrous potassium carbonate (10 g.), p-bromoanisole (0.4 m.) and cuprous iodide (0.5 g.) is heated at 200°–220° C. for 15 hours, (nitrobenzene (100 ml.) may be used as co-solvent if desired), the mixture cooled, chloroform added, the chloroform mixture washed with water, 1-N hydrochloric acid, water, dried, filtered, the chloroform removed in vacuo, and the residue chromatographed on a silica gel comumn using an ether-petroleum ether system (v/v 0–70 percent ether) as eluant to yield N-(p-nitrophenyl)-p-anisidine.

When m-bromoanisole is used in place of p-bromo-anisole in the above example, N-(p-nitrophenyl)-m-anisidine is obtained.

When m- and o-nitroanilines, o-, m- and p-toluidines, o-, m- and p-fluoroanilines, o-, m- and p-chloro-anilines, o-, m- and p-aminobiophenyl, o-, m- and p-dimethylaminoaniline (excluding the acid wash, or using an acid extraction), o-, m- and p-carbomethoxyanilines, p-aminoacetophenone, p-phenoxylaniline, p-benzyloxyaniline, 4-aminodiphenylmethane, p-methylsulfonylaniline and p-trifluoromethylaniline are used in place of p-nitroaniline in the above examples, the corresponding N-(substituted phenyl)-m- or p-anisidines are obtained.

When 4-bromo-2-methylanisole, 4-bromo-2-chloroanisole, 4-bromo-3-trifluoromethylanisole and 4-benzyloxy-2-bromoanisole are used in place of bromoanisole in the above examples, the corresponding N-(substituted phenyl)-substituted M- and p-anisidines are obtained.

C. N-Loweralkyl-N-substituted phenylanisidines

When the substituted N-phenylanisidines of Example 2 are reacted with dimethyl sulfate as in Example 1, the corresponding N-methyl-N-substituted phenylanisidines are obtained.

When ethyl sulfate is used in place of methyl sulfate, the corresponding N-ethyl-N-substituted phenyl-anisidines are obtained.

D. p-(N-Methylanilino)-phenol

A mixture of N-methyl-N-phenyl-p-anisidine (5 g.) and pyridine hydrochloride (25 g.) under a dry nitrogen atmosphere is placed in an oil-bath set at 230° C., kept there ten minutes, removed from the bath, cooled and extracted well with chloroform. The chloroform extracts are then washed with water, dried, and chromatographed on a silica gel column, using an ether-petroleum ether system (v/v 5–90 percent ether) as eluant yielding p-(N-methylanilino)-phenol.

When the anisidines of Parts A, B and C excepting those containing a benzyloxy group, are demethylated as above, the corresponding phenols are obtained.

When the anisidines contain a dimethylamino group, the reaction mixture must be treated with deaerated sodium bicarbonate solution before the chloroform extraction.

Demethylation is also achieved using boron tribromide, hydrogen iodide, and other common ether cleavage reagents known to the art.

E. p-(4-Methoxyanilino)-phenol

A mixture of 4-benzyloxy-4'-methoxydiphenylamine (0.01 m.), methanol (200 ml.) and 10% Pd/C (0.2 g.) is reacted in a hydrogen atmosphere (40 p.s.i.) at room temperature. When the theoretical amount of hydrogen has been absorbed, the mixture is filtered and the volatiles removed in vacuo to yield p-(4-methoxyanilino)-phenol.

When those substituted anisidines of Example 1 B and C containing a benzyloxy group are treated as above, the corresponding phenols are obtained.

F. 5-(p-Fluoroanilino)-salicylic acid

An intimately ground mixture of p-(4-fluoro-anilino)-phenol (5 g.) and anhydrous potassium carbonate (15 g.) is heated at 200° C. in a 1,200 – 1,400 p.s.i. carbon dioxide atmosphere for 8 hours. The mixture is cooled, added to water (300 ml.), stirred, filtered, and the filtrate acidified (pH 6) with dilute hydrochloric acid to yield 5-(p-fluoroanilino)-salicylic acid, m.p. 179°–181° C.

When the phenols of Parts D and E are carbonated as in the above example, the corresponding salicylic acid type compounds are obtained.

EXAMPLE 2

Methyl 5-(p-fluoroanilino)-salicylate

To a solution of anhydrous methanol (100 ml.) containing about 1 gram of anhydrous hydrogen chloride is added 0.01 m of 5-(p-fluoroanilino)-salicylic acid and the resultant mixture heated under reflux for several hours. The solvent is removed in vacuo, the residual material partitioned between chloroform dilute sodium bicarbonate solution, and the layers separated. The chloroform layer is dried, filtered, and concentrated in vacuo to methyl 5-(p-fluoroanilino)-salicylate.

Sulfuric acid may be used in place of hydrogen chloride in the above esterification.

When anhydrous ethanol is used in place of methanol in the above case, the ethyl ester is obtained.

Esterification is also achieved using diazo-methane in methylene chloride solution (one equivalent).

When the salicylic acids of Example 1F are used in place of 5-(p-fluoroanilino)-salicylic acid above, the corresponding methyl and ethyl esters are obtained.

EXAMPLE 3

2-Acetoxy-5-(p-fluoroanilino)-benzoic acid

To a mixture of 5-(p-fluoroanilino)-salicylic acid (0.04 m.) in anhydrous pyridine (15 ml.) is added acetic anhydride (28 ml.) and the resultant mixture heated gently on the steam cone for 1.5 hours, protected from moisture. On cooling, the mixture is added to a stirred 500 ml. portion of water, the aqueous system extracted well with chloroform, the chloroform extracts washed with 0.5 N hydrochloric acid, water, and dried over magnesium sulfate. Concentration of the filtered solution yields 2-acetoxy-5-(p-fluoroanilino)-benzoic acid. Further purification is affected via recrystallization or chromatography of the methyl ester (diazomethane).

When propionic or butyric anhydride is used in place of acetic anhydride in the above example, the corresponding propionoxy and butyroxy compound is obtained.

When the salicylic acids of Example 1 are used in place of 5-(p-fluoroanilino)-salicylic acid in the above example, the corresponding acyloxybenzoic acids are obtained.

EXAMPLE 4

Methyl 5-(N-methyl-p-hydroxyanilino)-salicylate

When methyl 5-(N-methyl-p-methoxyanilino)-salicylate is demethylated as per Example 1D, methyl 5-(N-methyl-p-hydroxyanilino)-salicylate is obtained.

EXAMPLE 5

5-(p-Benzyloxy-N-methyl-anilino)-salicylic acid

A mixture of 5-(N-methyl-p-hydroxyanilino)-salicylic acid (0.01 m.), anhydrous potassium carbonate (0.02 m.) and anhydrous methanol (50 ml.) is stirred for ca. 30 minutes, protected by a calcium chloride drying tube. Benzyl chloride (0.02 m.) is added, the mixture refluxed for 6 hours, potassium hydroxide (2 g.) and water (100 ml.) added, the mixture refluxed one hour, filtered cold, acidified with dilute hydrochloric acid, the acid collected and purified via recrystallization or column chromatography of its methyl ester, yielding 5-(p-benzyloxy-N-methylanilino)-salicylic acid.

EXAMPLE 6

Methyl 5-(p-amino-N-methylanilino)-salicylate

A mixture of methyl 5-N-methyl-p-nitroanilino-salicylate (0.01 m.) in methanol-dioxane (1:1) (ca. 200 ml.) is reacted with hydrogen at room temperature, 40 p.s.i., in the presence of 10 percent palladium on carbon (0.3 g.). The mixture is filtered, the cake washed well with methanol, the filtrate concentrated in vacuo, the residue chromato-graphed on a silica-gel column using a methanol-methylene chloride system (v/v 0–30 percent methanol) as eluant to yield methyl 5-(p-amino-N-methylanilino)-salicylate.

EXAMPLE 7

2-Acetoxy-5-p-(acetoxy or acetamido)-N-methylanilino)-benzoic acid

When 5-(p-hydroxy-N-methylanilino)-salicylic acid and 5-(p-amino-N-methylanilino)-salicylic acid are reacted with acetic anhydride as per Example 3, 2-acetoxy-5-(p-acetoxy-N-methylanilino)-benzoic acid and 2-acetoxy-5-(p-acetamido-N-methylanilino)-benzoic acid are obtained, respectively.

EXAMPLE 8

5-(p-Carboxy-N-methylanilino)-salicylic acid

To a mixture of 5-(p-carbomethoxy-N-methylanilino) salicylic acid (0.01 m.) and methanol (100 ml.) is added with stirring sodium hydroxide (0.06 m.) and water (15 ml.) and the resultant mixture stirred overnight at room temperature, diluted with water (200 ml.) filtered, the filtrate acidified with 2.5N hydrochloric acid, and the 5-(p-carboxy-N-methylanilino)-salicylic acid collected.

EXAMPLE 9

Methyl 5-(p-Cyano-N-methylanilino)-salicylate

A mixture of methyl 5-(p-chloro-N-methylanilino)-salicylate (0.02 m.) cuprous cyanide (0.03 m.) and freshly distilled N-methylpyrrolidine is deaerated, covered with a nitrogen atmosphere, heated slowly to 180° C., kept 3 hours, allowed to cool, partitioned between benzene - 7% hydrochloric acid containing ferric chloride (0.03 m.), the benzene layer separated, dried, concentrated, and the residue chromatographed on a silica-gel column using an ether-petroleum ether system (v/v 5–90 percent ether) as eluant to yield methyl 5-(p-cyano-N-methylanilino)-salicylate.

EXAMPLE 10

5-(p-Carbamyl-N-methylanilino)-salicylic acid

A mixture of 5-(p-cyano-N-methylanilino)-salicylic acid (0.002 m.) and polyphosphoric acid (5 ml.) is heated on a steam cone for 1 hour, cooled, added to ice-water, the aqueous layer basified with sodium bicarbonate, heated on the steam cone to hydrolyze any ester or anhydride formed, filtered and acidified with dilute hydrochloric acid. The 5-(p-carbamyl-N-methylanilino)-salicylic acid is then collected.

EXAMPLE 11

Methyl 5-(p-aminomethyl-N-methylanilino)-salicylate

Methyl 5-(p-cyano-N-methylanilino)-salicylate (0.005 m.) in acetic acid (50 ml.) is reduced at room temperature under a 40 p.s.i. hydrogen atmosphere using 0.5 g. of $PtO_2$ as catalyst. When the theoretical amount of hydrogen is consumed, the mixture is filtered, the solvent removed in vacuo, and the residue chromatographed on a silica-gel column using a methanol-methylene chloride system (v/v 0–20 percent methanol) as eluant to yield methyl 5-(p-aminomethyl-N-methylanilino)-salicylate.

EXAMPLE 12

5-(p-Dimethylaminomethyl-N-methylanilino)-salicylate

A mixture of methyl 5-(p-aminomethyl-N-methyl-anilino)-salicylate (0.004 m.), 37 percent formaldehyde (6 ml.), anhydrous 1,2-dimethoxyethane (80 ml.), glacial acetic acid (50 ml.) and Raney Nickel (0.3 tsp.) is treated with hydrogen (40 p.s.i.) at room temperature. When hydrogen uptake is completed, the mixture is filtered, the cake washed well with fresh dimethoxyethane, the combined filtrates distributed between chloroform-dilute sodium bicarbonate solution, the chloroform layer dried, filtered, concentrated, and the residue chromatographed on a silicagel column using an ether-petroleum ether system (v/v 5–90 percent ether) as eluant to yield methyl 5-(p-dimethylamino-methyl-N-methylanilino)-salicylate.

EXAMPLE 13

A. When p-methylthioaniline and 4-benzyloxy-bromobenzene are reacted as per Example 1B, there is obtained 4-benzyloxy-4'-methylthiodiphenylamine.

B. When 4-benzyloxy-4'-methylthiodiphenylamine is reacted with hydrogen and excess catalyst as per Example 11, and the resultant phenol carbonated as per Example 1F, 5-(p-methylthioanilino)-salicylic acid is obtained.

C. When methyl 5-(p-methylthionanilino)-salicylate (from the corresponding acid via procedure of Example 2) is demethylated as per Example 1D, methyl 5-(p-mercaptoanilino)-salicylate is obtained.

EXAMPLE 14

Methyl 5-(p-methylsulfinylanilino)-salicylate

To methyl 5-(p-methylmercaptoanilino)-salicylate (0.01 m.) in acetone-methanol (1:1) (200 ml.), at 0°–5° C., is added sodium metaperiodate (0.01 m.) in a minimum of water for solution. The mixture is allowed to stir cold until precipitation of sodium iodate is completed, filtered, the solvents removed in vacuo, the residue taken up in anhydrous chloroform, washed one time with water, filtered, and concentrated to methyl 5-(p-methylsulfinylanilino)-salicylate.

EXAMPLE 15

A. 4-Acetoxy-4'-bromomethyl-N-methyldiphenylamine

A mixture of 4-acetoxy-4', N-dimethyldiphenylamine (from the corresponding phenol and acetic anhydride via the procedure of Example 3, (0.05 m), N-bromosuccinimide (0.05 m), carbon tetrachloride (500 ml.) and dibenzoyl peroxide (0.002 m) is refluxed gently for 3 hours, cooled, the succinimide removed by filtration, and the solvent removed in vacuo to yield crude 4-acetoxy-4'-bromomethyl-N-methyldiphenylamine, used as is in the following two sections.

B. 4-Hydroxy-4'-hydroxymethyl-N-methyldiphenylamine

A mixture of 4-acetoxy-4'-bromomethyl-N-methyldiphenylamine (0.01 m), silver acetate (0.01 m) and acetic acid (30 ml.) is heated gently for three hours, cooled, filtered, and the filtrate concentrated in vacuo to a residue of crude 4-acetoxy-4'-acetoxymethyl-N-methyl-diphenylamine. Anhydrous methanol (50 ml.) and p-toluene-sulfonic acid is added, the mixture refluxed for three hours, concentrated, distributed between water-chloroform and the chloroform layer dried, concentrated, and the concentrate chromotographed on a silica gel column using an ether-petroleum ether, system (v/v 0–100 percent ether) as eluant to yield 4-hydroxy-4'-hydroxymethyl-N-methyldiphenylamine.

When potassium thiolacetate is used in place of silver acetate in the above reaction, 4-hydroxy-4'-mercaptomethyl-N-methyldiphenylamine is obtained.

C. 4-Hydroxy-4'-methoxymethyl-N-methyldiphenylamine

4-Acetoxy-4'-bromomethyl-N-methyldiphenylamine (0.01 m) is added to a stirred solution of sodium methoxide (0.02 m) in anhydrous methanol, the mixture refluxed gently for 1 hour, cooled, traces of dilute hydrochloric acid added to neutralize the mixture, the solvents removed in vacuo, and the residue chromotographed on a silica gel column using an ether-petroleum system (v/v 0–80 percent ether) as eluant to yield 4-hydroxy-4'-methoxymethyl-N- methyldiphenylamine.

When potassium methylmercaptide replaces sodium methoxide, above, 4-hydroxy-4'-methylmercaptomethyl-N-methyldiphenylamine is obtained.

D.

When the hydroxydiphenylamines of Parts B and C are carbonated as per Example 1F, the corresponding salicylic acids, 5-(p-methoxymethyl-N-methylanilino)-salicylic acid, 5-(p-methylthiomethyl-N-methylanilino)-salicylic acid, 5-(p-hydroxymethyl-N-methylanilino)-salicylic acid, and 5-(p-mercaptomethyl-N-methylanilino)-salicylic acid are obtained.

EXAMPLE 16

5-(Polysubstitutedanilino)-salicylic acid

When 2,4,5-trimethylaniline and 1-bromoanisole are reacted as per Example 1B, the resulting diphenylamine demethylated as per Example 1D, and the phenol formed carbonated as per Example 1F, 5-(2,4,5-trimethylanilino)-salicylic acid is obtained.

When dimethyl, other trimethyl, tetramethyl, dichloro, trichloro, tetrachloro, pentachloro and other polysubstituted anilines are used in place of 2,4,5-trimethylaniline in the above sequence, the corresponding 5-(polysubstituted anilino)-salicylic acids are obtained.

EXAMPLE 17

5-(N-Methylanilino)-O-anisic acid

To a hot solution of 5-(N-methylanilino)-salicylic acid (0.01 m.) in 2.0 N sodium hydroxide solution (50 ml.) is added dimethylsulfate (7 × 0.5 cc. portions) over ca. 210 mins. The resulting mixture is allowed to stir several hours, filtered, acidified with 2.0 N hydrochloric acid, and the crude 5-(N-methylanilino)-O-anisic acid collected.

EXAMPLE 18

Methyl 2-carboxy-4-(N-methylanilino)-phenyl carbonate

To a mixture of 5-(N-methylanilino)-salicylic acid (0.01 m.), dimethylaniline (0.02 m.) and benzene (30 ml.) is added methyl chloroformate (0.011 m.) over one hour with constant agitation and cooling. When the odor of the chloroformate is essentially gone, hydrochloric acid (1 N, 100 ml.) is added and the mixture filtered, any cake being washed well with benzene. The benzene layer is separated, dried, filtered, and the benzene removed in vacuo to yield methyl 2-carboxy-4-(N-methylanilino)-phenyl carbonate.

EXAMPLE 19

5-(N-Methylanilino)-salicylamide

A mixture of methyl 5-(N-methylanilino)-salicylate and concentrated ammonium hydroxide (5 × excess) is heated at 100° C. in a sealed tube for 6 hours. After cooling, water is added and the 5-(N-methylanilino)-salicylamide collected.

When monomethylamine, dimethylamine, ethylamine, diethylamine, morpholine, piperidine, etc. are used in place of ammonium hydroxide, the corresponding amides are obtained.

EXAMPLE 20

N,N-Diethylaminoethyl 5-(N-methylanilino)-salicylate

To a mixture of 5-(N-methylanilino)-salicylic acid (0.01 m.) and N,N-diethylethanolamine (0.01 m.) in anhydrous tetrahydrofuran (100 ml.) is added a solution of dicyclohexylcarbodiimide (0.01 m.) in a minimum of the same solvent. The mixture is stoppered, shaken well, and allowed to stand overnight. The precipitated dicyclohexyl-urea is removed by filtration, the filtrate concentrated in vacuo, the residue partitioned between ether and 1 N hydrochloric acid, the layers separated, the aqueous layer washed once with fresh ether and then neutralized with saturated sodium bicarbonate solution. Extracting with chloroform, followed by removal of the chloroform in vacuo (high vacuum pump to remove traces of starting amine) yields (N,N-diethylaminoethyl 5-N-methylanilino)-salicylate.

EXAMPLE 21

Sodium 5-(N-methylanilino)salicylate

Solutions of 5-(N-methylanilino)-salicylic acid (0.01 m.) in methanol and sodium hydroxide (0.01 m.) in water are mixed, heated gently, filtered, and the filtrate concentrated in vacuo to leave sodium 5-(N-methylanilino)-salicylate.

When potassium hydroxide is used in place of sodium hydroxide in the above example, the corresponding potassium salt is obtained.

When two equivalents of the above bases are used, the corresponding di-sodio and di-potassio salts are obtained.

EXAMPLE 22

Diethylaminoethyl salt of 5-(N-methylanilino)salicylic acid

To a stirred solution of 5-(N-methylanilino)-salicylic acid (0.001 m.) in chloroform-methanol is added an ether solution of N,N-diethylaminoethanol (0.001 m.), the resultant mixture stirred one hour and the solvent removed in vacuo to yield the diethylaminoethanol salt of 5-(N-methylanilino)-salicylic acid.

When piperidine, morpholine, triethylamine, N-methylpiperidine, N-methylmorpholine, tributylamine, or other organic amines are used in place of diethylaminoethanol in the above example, the corresponding salt is obtained.

EXAMPLE 23

Phenyl 5-(N-methylanilino)-salicylate

To a mixture of polyphosphate esters (15 equiv.) chloroform is added one equivalent each of 5-(N-methylanilino)-salicylic acid and phenol, and the resultant mixture heated gently for 30 minutes, cooled, washed well with dilute sodium bicarbonate solution, water, dried, and the chloroform removed in vacuo to yield phenyl 5-(N-methylanilino)-salicylate.

EXAMPLE 24

5-(N-methylanilino)-salicylanilide

A mixture of phenyl 5-(N-methylanilino)-salicylate (0.1 m.), aniline (0.1 m.) and 1-methylnaphthalene (50 ml.) is heated slowly to 230° C., kept at this temperature until phenol has stopped distilling (a slight vacuum is sometimes necessary to bring the phenol over) charcoal (2 g.) added, then 20 ml. additional 1-methylnaphthalene, heating continued 10 minutes, the mixture filtered hot and allowed to cool. The collected material is then recrystallized to yield pure 5-(N-methylanilino)-salicylanilide.

We claim:

1. A compound of the formula:

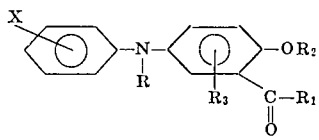

or a non-toxic pharmaceutically acceptable salt, wherein
R is hydrogen or
   loweralkyl, being hydrogen only when X is fluoro,
$R_1$ is hydroxy, or
   loweralkoxy,
$R_2$ is hydrogen, or
   loweralkyl, the $OR_2$ radical being ortho to the

radical,
$R_3$ is hydrogen,
X is fluoro, chloro,
   diloweralkylamino,
   loweralkylsulfinyl,
   loweralkylsulfonyl,
with the anilino portion of the substituted anilino carboxylic acid connected to the 4 or 5 position of the salicylic acid moiety.

2. A compound of claim 1
wherein X is fluoro;
   R is hydrogen;
   $R_1$ is hydroxy;
   $R_2$ is hydrogen;
   $R_3$ is hydrogen;

3. A compound of claim 1
wherein X is fluoro;
   R is methyl;
   $R_1$ is hydroxy;
   $R_2$ is hydrogen;
   $R_3$ is hydrogen.

4. A compound of claim 1
wherein X is fluoro;
   R is methyl;
   $R_1$ is methoxy;
   $R_2$ is hydrogen;
   $R_3$ is hydrogen.

* * * * *